United States Patent
Pohan et al.

(10) Patent No.: US 7,372,938 B2
(45) Date of Patent: May 13, 2008

(54) DETECTOR UNIT FOR A COMPUTER TOMOGRAPH

(75) Inventors: Claus Pohan, Baiersdorf (DE); Gottfried Tschoepa, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 11/280,183

(22) Filed: Nov. 17, 2005

(65) Prior Publication Data

US 2006/0126782 A1 Jun. 15, 2006

(30) Foreign Application Priority Data

Nov. 18, 2004 (DE) ...................... 10 2004 055 752

(51) Int. Cl.
*G01N 23/00* (2006.01)
(52) U.S. Cl. ......................... 378/19; 378/189
(58) Field of Classification Search ................. 378/19, 378/189
See application file for complete search history.

(56) References Cited

U.S. PATENT DOCUMENTS

| | | | |
|---|---|---|---|
| 4,831,639 A | 5/1989 | Harke | |
| 4,969,167 A | 11/1990 | Zupancic et al. | 378/19 |
| 5,761,269 A | 6/1998 | Sugihara et al. | 378/199 |
| 6,411,672 B1 | 6/2002 | Sasaki et al. | 378/19 |
| 6,909,775 B2 | 6/2005 | Ray et al. | 378/141 |
| 2004/0022351 A1 | 2/2004 | Lacey et al. | 378/19 |
| 2004/0071259 A1 | 4/2004 | Lacey et al. | 378/19 |

FOREIGN PATENT DOCUMENTS

| | | |
|---|---|---|
| DE | 197 04 338 A1 | 8/1998 |
| EP | 0182040 B1 | 11/1988 |
| EP | 0296339 A1 | 12/1988 |
| WO | WO 03/046610 A1 | 6/2003 |

OTHER PUBLICATIONS

German Office Action (dated Jan. 2, 2007) for counterpart German Patent Application DE 10 2004 055 752.

*Primary Examiner*—Jurie Yun
(74) *Attorney, Agent, or Firm*—Harness, Dickey & Pierce, P.L.C.

(57) ABSTRACT

A detector unit of a computer tomograph includes a base surface that faces a support ring of a gantry of the computer tomograph in a mounting position, and a detector surface that is angled away from the base surface in an approximately perpendicular fashion, faces an isocentric axis of the gantry in the mounting position, and along which there are fitted a number of detector elements for detecting x-radiation. The base surface has an air inlet fitted in such a way that a cooling airflow applied from outside to the base surface is guided onto the inner side of the detector surface. In the mounting position, the air inlet corresponds with an air channel guided in the support ring or between the rotary carriage and the support ring.

21 Claims, 6 Drawing Sheets

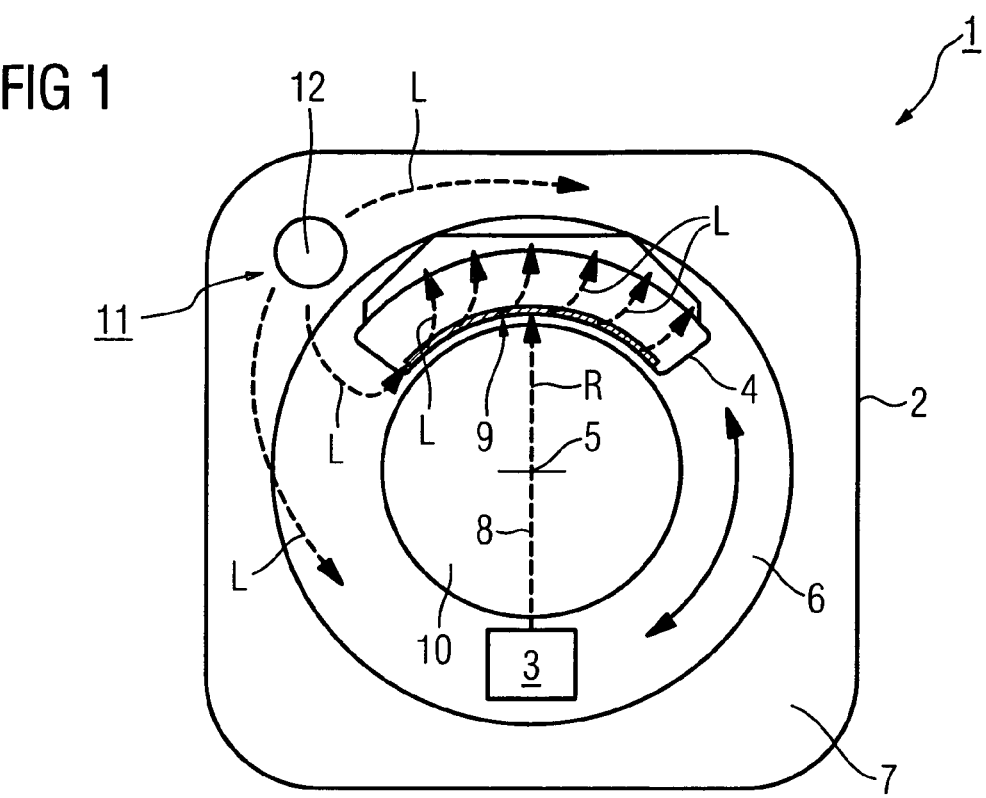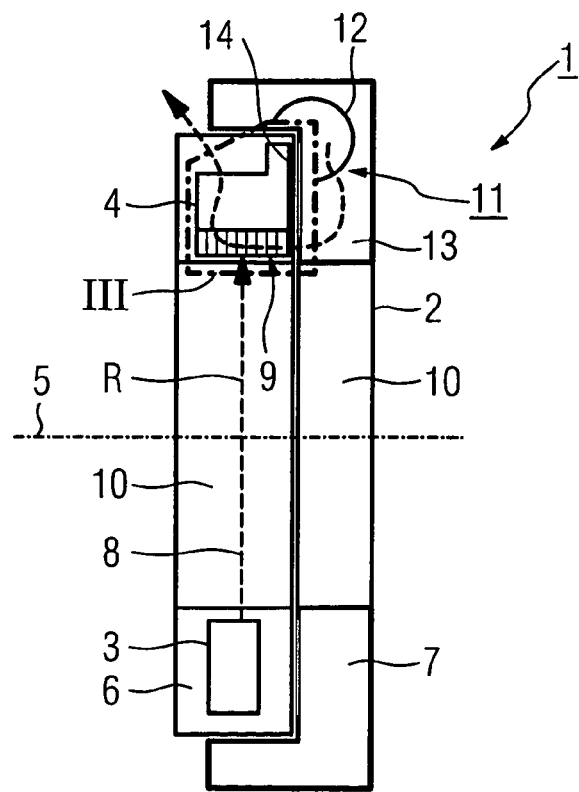

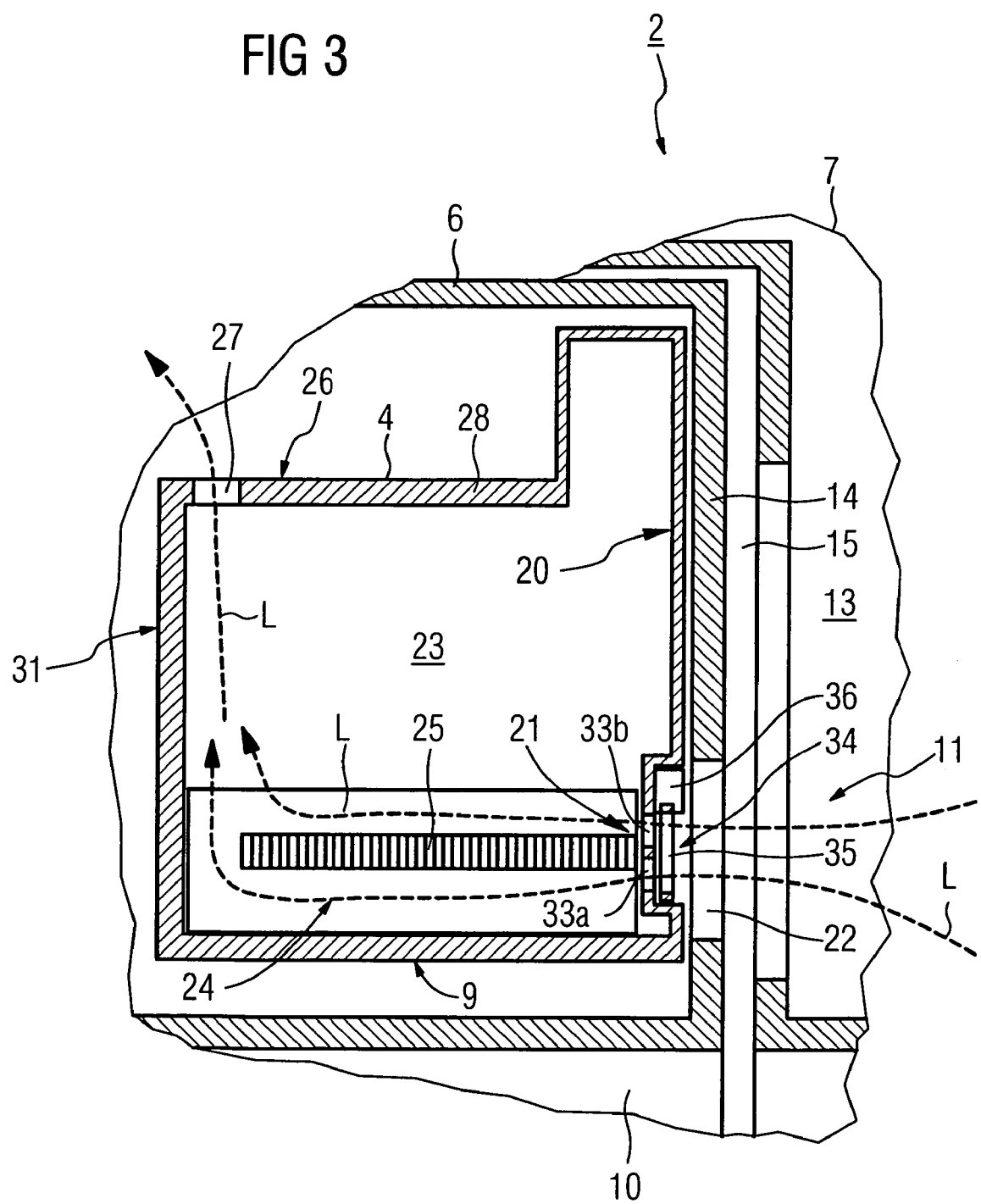

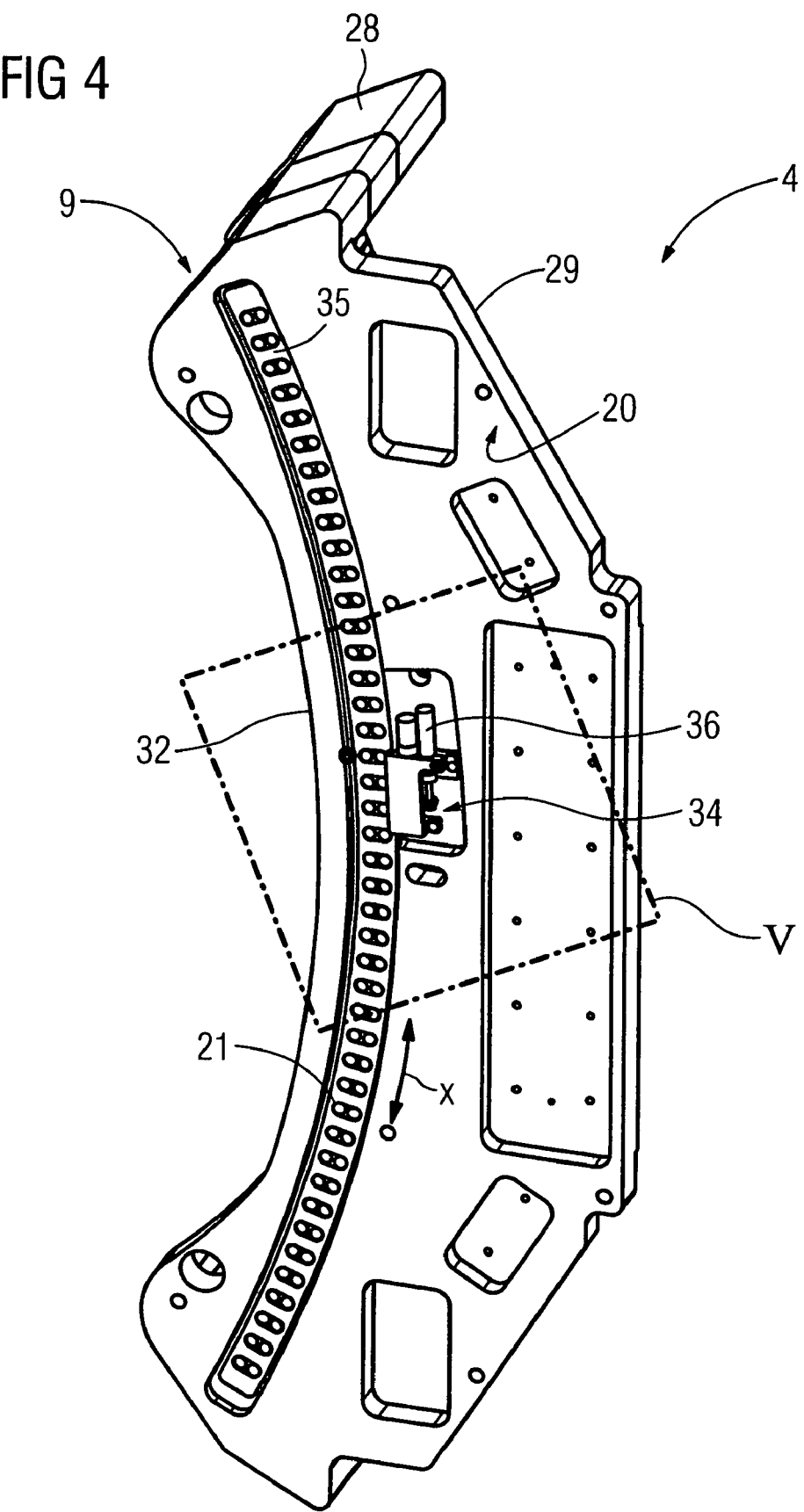

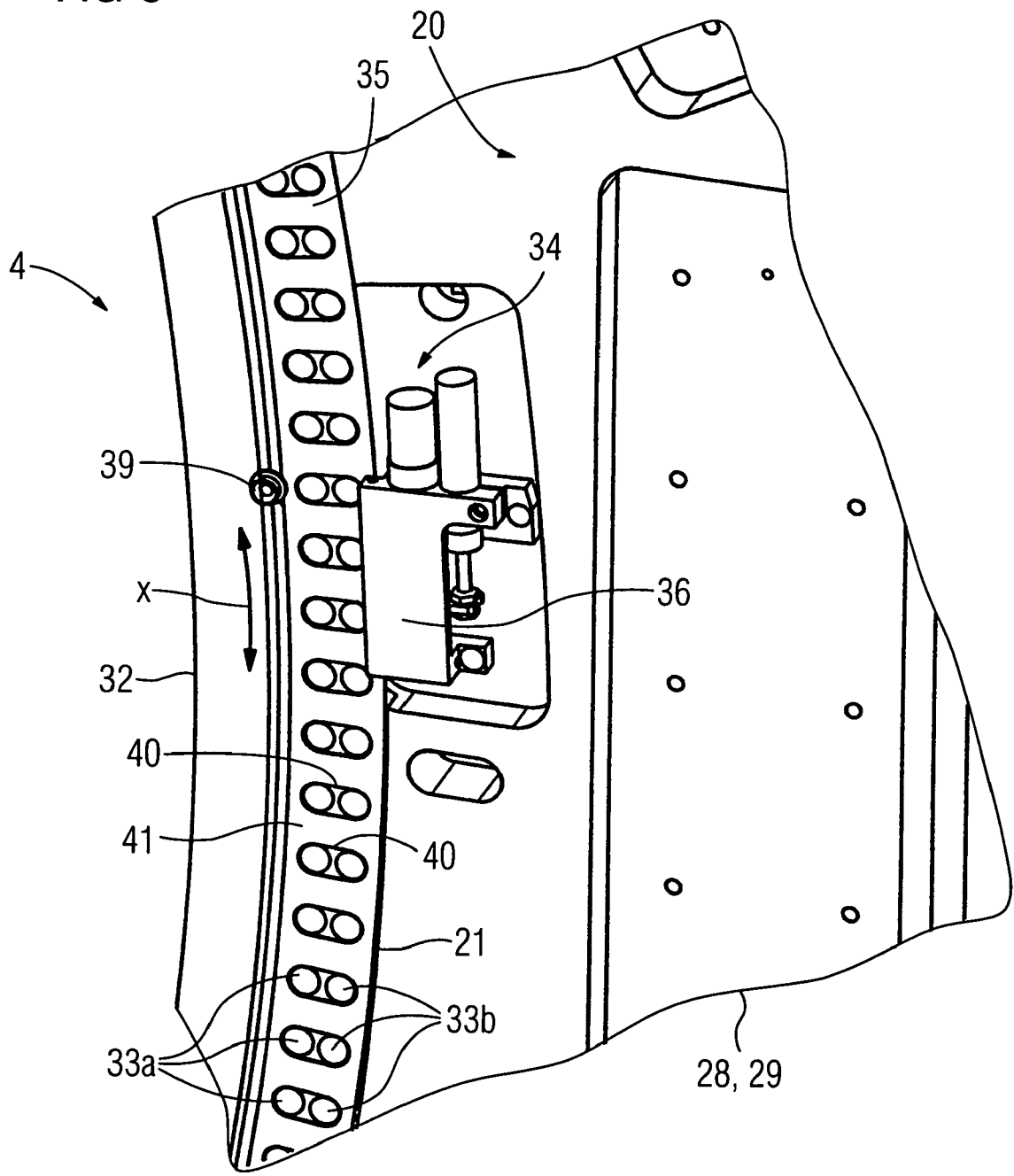

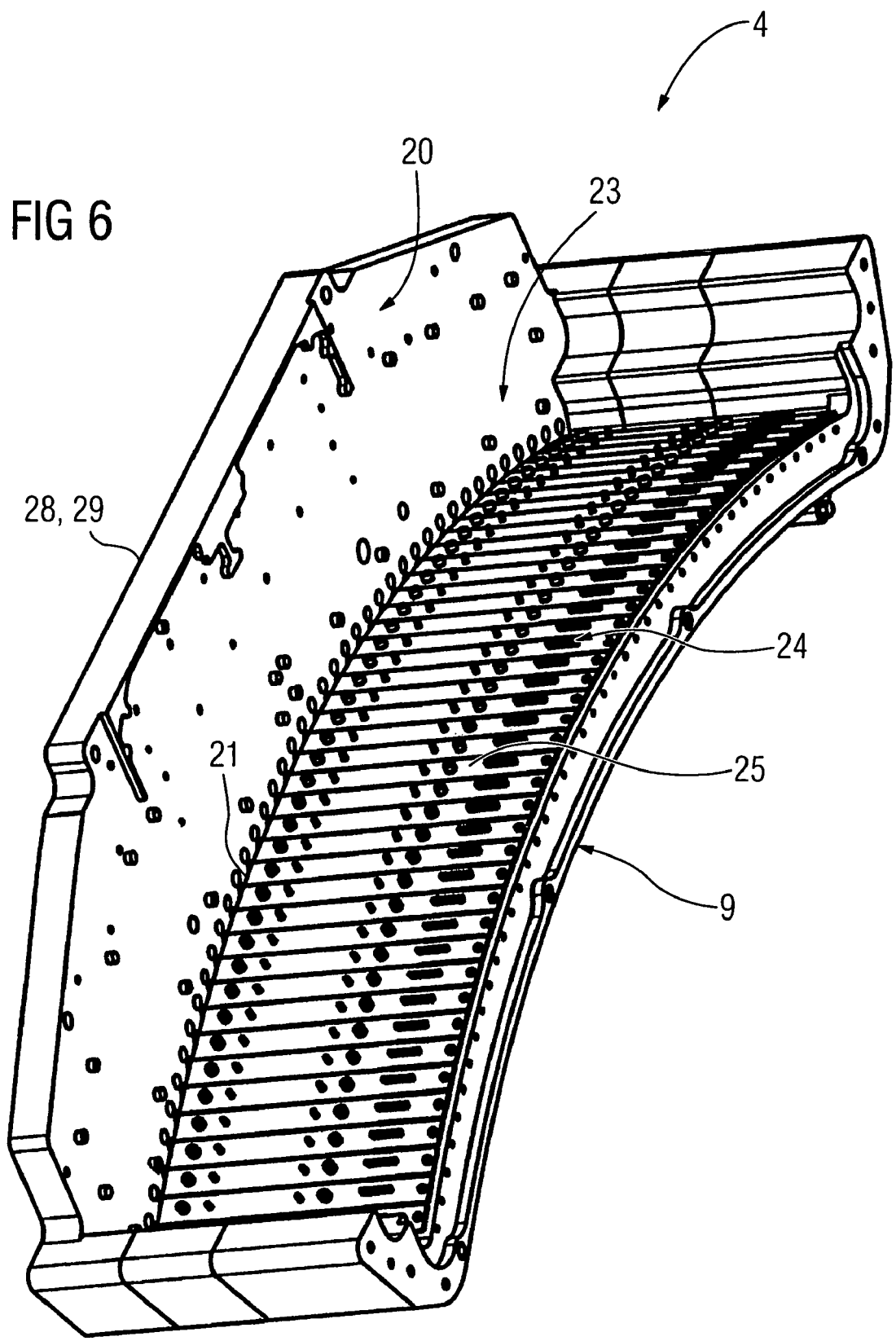

DETECTOR UNIT FOR A COMPUTER TOMOGRAPH

The present application hereby claims priority under 35 U.S.C. §119 on German patent application number DE 10 2004 055 752.7 filed Nov. 18, 2004, the entire contents of which is hereby incorporated herein by reference.

FIELD

The invention generally relates to a detector unit for a computer tomograph. The invention furthermore generally relates to a computer tomograph including the detector unit.

BACKGROUND

A computer tomograph is an apparatus for producing a three-dimensional image of an object to be examined, in particular of a patient, via x-ray diagnostic methods. A conventional computer tomograph such as is disclosed, for example, in EP 0 296 339 A1 includes a substantially angular supporting frame, denoted as a gantry, having a rotary carriage that can rotate about an isocentric axis, and a support ring, which is stationary with reference to the rotation about the isocentric axis, for bearing the rotary carriage. The rotary carriage and the support ring have a common central opening into which the object to be examined is pushed for imaging. The rotary carriage holds an x-ray emitter for transirradiating the object. The rotary carriage further includes a detector unit that is held on the gantry in a position opposite the x-ray emitter and serves the purpose of recording x-ray projection images of the object.

In the course of a computed tomography examination, such x-ray projection images of the object as the rotary carriage rotates are recorded from a multiplicity of projection directions. Subsequently, a three-dimensional image of the object is calculated in a slicewise fashion via numerical backhand projection methods from the x-ray projection images.

The detector unit of a computer tomograph normally includes a multiplicity of detector elements that are arranged along a detector surface and each have an assigned evaluation electronic. During operation of the computer tomograph, the detector elements and, in particular, their electronic components generate a substantial heat loss that must be dissipated, if only to avoid overheating of the detector unit. Moreover, the maintenance during operation of the computer tomograph of a detector temperature that is as constant as possible is of great importance in order to avoid a so-called temperature drift, that is to say a thermally conditioned change in the recording characteristic of the computer tomograph.

To date, one or more variable-speed fans have frequently been used for cooling such a detector unit, these being directly assigned to the detector and thus being arranged on the rotary carriage. Such a cooling system, in which an oil cooling system is additionally provided, is disclosed, for example, in EP 0 296 339 A1. Because gantry rotational speeds of modern computer tomographs are becoming ever higher with the advancing development, the use of such fans is limited as a consequence of the centrifugal forces occurring and of frequent fan failures thereby caused through bearing damage.

Alternatively, DE 197 04 338 A1 discloses utilizing the airflow caused by the gantry rotation itself to cool electronic power components that are arranged on the rotary carriage of a gantry on a computer tomograph.

SUMMARY

It is an object of at least one embodiment of the invention to specify a detector unit for a computer tomograph that is advantageous with respect to effective heat dissipation. One aim may be to implement the detector unit in a particularly simple way, and also to render it suitable for a high centrifugal force loading. At least one embodiment of he invention also includes an object of specifying a computer tomograph having an effective cooling system for the detector unit that is easy to implement and is, in particular, suitable for a high gantry rotational speed.

According to at least one embodiment of the invention, an object may be achieved with reference to a detector unit. According to at least one embodiment of the invention, an object may be achieved with reference to the associated computer tomograph.

Provision is thereby made to provide on a base surface of the detector an air inlet designed in such a way that a cooling airflow produced outside the detector unit is guided through the air inlet onto an inner side of the detector surface of the detector unit.

Designated in this case as base surface is the surface of the detector unit that is angled away approximately perpendicularly from the detector surface and faces the support ring of a gantry of a computer tomograph in the envisaged mounting position of the detector unit. Designated in turn as detector surface is the surface of the detector unit that faces an isocentric axis of the gantry in the envisaged mounting position, and along whose inner side there are arranged a number of detector elements.

As a consequence of the air inlet provided in the base surface, the detector unit can easily be connected to a cooling air guide arranged in the stationery part of the gantry, thus rendering fans in the rotating part of the gantry, that is to say the rotary carriage, dispensable. This makes a decisive contribution to the stability of the detector unit under a high centrifugal force loading, and so the detector unit according to at least one embodiment of the invention can be used without any problem in a modern, rapidly rotating computer tomograph.

In at least one embodiment, the air inlet is guided at a small spacing from an edge that delimits the base surface from the detector surface. A particularly effective flushing of the detector elements provided in the surroundings of the detector surface is achieved in this way. The air inlet is particularly adapted here to the shape of the detector surface and has an arcuate contour adapted to a curvature of the detector surface. The air inlet is preferably formed by a number of juxtaposed inlet openings. There are advantageously provided, in particular, two rows of inlet openings between which the detector elements are arranged such that the detector elements are flushed with cooling air from two sides.

In order to be able to control the cooling air feed for the purpose of keeping the detector temperature constant, the detector unit may include, for example, a control device which can reversibly seal or release the air inlet. In an expedient design that is easy to implement, this control device includes a baffle that is arranged in a fashion capable of displacement parallel to the base surface and by means of which the air inlet is released or at least partially covered depending on the baffle position. Here, the baffle can be adjusted continuously in particular by use of a motorized drive unit between an open position completely releasing the air inlet, and a closed position completely closing the air inlet.

The baffle is expediently designed as a perforated baffle and includes a number of control openings, each inlet opening of the air inlet in the base surface corresponding with a control opening of the baffle in the open position of the baffle, and inlet openings and control openings being arranged next to one another at least substantially in a fashion free from overlap in a closed position of the baffle such that the inlet openings are closed by the baffle. With regard to a stable guide that can be implemented easily, the baffle can advantageously be displaced in the longitudinal direction of the air inlet, in particular.

An air circulation that is particularly advantageous with regard to an effective heat dissipation is achieved by virtue of the fact that an air outlet is arranged on an outer surface of the detector unit situated opposite the detector surface.

In the mounting position preferably provided, the detector unit is fastened in the rotary carriage in such a way that the base surface bears substantially against a rear wall of the rotary carriage. The base surface preferably serves in this case as mounting surface for the detector unit. Designated as rear wall is a wall of the rotary carriage that delimits the latter from the neighboring support ring. The rear wall is provided with a passage opening flush with the air inlet in the detector unit such that the air inlet through the passage opening corresponds with an air channel guided inside the support ring or between the support ring and the rotary carriage. This air channel is, in particular, closed in annular fashion around the isocentric axis and therefore corresponds with the air inlet of the detector unit independently of the rotary position of the rotary carriage.

Connected to the air channel are one or more fans that are held, in particular, in the support ring, and thus in a stationary fashion with reference to the rotary carriage. However, it is also possible as an alternative for the support ring to be connected to a blower arranged outside the gantry.

BRIEF DESCRIPTION OF THE DRAWINGS

An example embodiment of the invention is explained in more detail below with the aid of drawings, in which:

FIG. 1 shows a schematic plan view along the isocentric axis of a computer tomograph having a gantry as well as a detector unit held in a rotary carriage of the gantry, FIG. 2 shows a schematic cross section of the computer tomograph in accordance with FIG. 1, FIG. 3 shows a schematically enlarged detailed illustration III in accordance with FIG. 2 of the detector unit of the computer tomograph in accordance with FIG. 1, FIG. 4 shows a housing base of the detector unit in a perspective view from outside onto a base surface of said detector unit, having an air inlet and a control device assigned to the latter, FIG. 5 shows the air inlet and the control device in an enlarged detailed view V in accordance with FIG. 4, FIG. 6 shows the housing base of the detector unit in accordance with FIG. 4 in a perspective view from inside onto the base surface and a detector surface.

The same reference symbols are always used in all the figures for mutually corresponding parts and variables.

DETAILED DESCRIPTION OF THE EXAMPLE EMBODIMENTS

Figure 7:
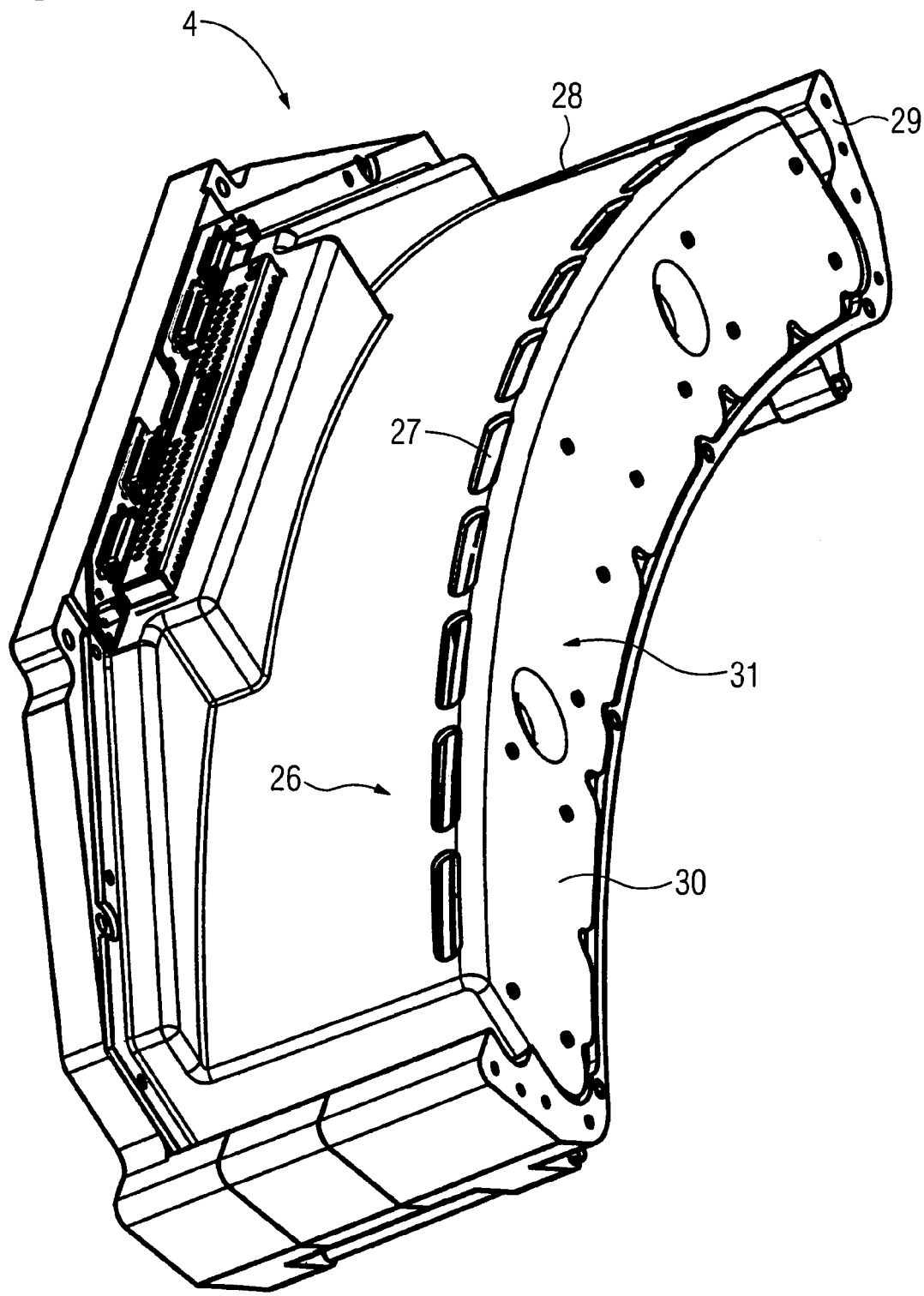
FIG. 7 shows, in an illustration in accordance with FIG. 6, the housing of the detector unit in accordance with FIG. 4 in a fashion closed by the housing base and a housing cover.

FIGS. 1 to 3 show a computer tomograph 1 in a highly schematic simplification. The computer tomograph 1 includes a supporting frame that is designated as a gantry 2 and on which there are held an x-ray emitter 3 and a detector unit 4 designed for detecting the x-radiation R emitted by the x-ray emitter 3.

The gantry 2 includes a rotary carriage 6 supported in a fashion capable of rotation about an isocentric axis 5, and a support ring 7 that is stationary with reference to a rotation about the isocentric axis 5 and in which the rotary carriage 6 is supported.

The x-ray emitter 3 and the detector unit 4 are held on the rotary carriage 6 in opposite positions such that a beam axis 8 of the x-radiation R emitted by the x-ray emitter 3 cuts the isocentric axis 5 and strikes a detector surface 9 of the detector unit 4 approximately in the middle. The x-radiation R emitted by the x-ray emitter 3 in this case traverses a tunnel-like opening 10, approximately centered with reference to the isocentric axis 5, in the gantry 2, into which an object to be examined, in particular a patient, can be pushed for imaging.

The computer tomograph 1 further includes a cooling system 11 for cooling the detector unit 4. The cooling system 11 includes a fan 12 that is arranged in a stationary fashion in the support ring 7 of the gantry 2 and produces an airflow L in an air channel 13 (FIG. 2) constructed inside the support ring 7 and closed in an annular fashion around the isocentric axis 5. The support ring 7 is at least partially open on a side neighboring the rotary carriage 6, and so the air channel 13 borders directly on a rear wall 14 of the rotary carriage 6 (FIG. 3).

In the interior of the rotary carriage 6, the detector unit 4 bears in turn against the rear wall 14 with a base surface 20 that preferably serves as mounting surface for the detector unit 4. Here, an air inlet 21 provided in the base surface 20 corresponds with a passage opening 22 introduced into the rear wall 14, such that an interior 23 of the detector unit 4 is connected to the air channel 13 via the air inlet 21 and the passage opening 22. The air inlet 21 is arranged at a small spacing from the detector surface 9 in the base surface 20 such that the airflow L entering into the interior 23 through the air inlet 21 is led substantially along an inner side 24 of the detector surface 9 and flushes a number of detector elements 25, arranged in this region, of the detector unit 4. The airflow L is subsequently led away from the detector surface 9 to an outer surface 26, averted therefrom, of the detector unit 4, and emerges from the detector unit 4 through an air outlet 27 provided there.

FIGS. 4 to 7 show the detector unit 4 in various perspective views. It is to be seen herein that the detector unit 4 has a substantially bipartite housing 28, the base surface 20 and the detector surface 9 being constituents of a housing base 29 depicted in FIGS. 4 to 6. The counter part to the housing base 29 forms a housing cover 30 that is formed from the outer surface 26 and a top surface 31 angled away from the latter approximately at right angles, and that is depicted in FIG. 7 in an illustration of the closed housing 28.

As may be seen by viewing FIGS. 4 to 6 all together, the detector surface 9 is arcuately curved, the detector elements 25 being lined up along the inner side 24 of the detector surface 9. The air inlet 21 follows this curvature and therefore has an elongated, arcuate contour that runs at a small spacing along an edge 32 that delimits the base surface 20 from the detector surface 9. The air inlet 21 is formed by two rows, running parallel to one another in the longitudinal direction X of the air inlet 21, of inlet openings 33a and 33b (FIG. 5). Two inlet openings 33a and 33b, respectively, situated opposite one another in pairs, are respectively arranged in this case in such a way that they open into the interior 23 on different sides of a corresponding detector element 25 such that the detector element 25 is flushed on both sides (FIG. 3).

The detector unit 4 includes a control device 34 for the purpose of simple control of the airflow L inside the interior 23, and thus for the purpose of simple regulation of the cooling power achieved by the airflow L. The control device 34 includes a baffle 35 that is adapted to the arcuate contour of the air inlet 21 and is guided such that it can be displaced in a longitudinal direction X of the air inlet 21 by a drive unit 36 with a small electric motor. The drive of the baffle 35 is performed here via a spindle drive (not shown in more detail) of the drive unit 36, the spindle nut having a tappet that engages in a corresponding recess in the baffle 35. The guidance of the baffle 35 in the longitudinal direction X is achieved by virtue of the fact that the air inlet 21 is designed to be slightly depressed by comparison with the base surface 20, the baffle 35 lying in this depression. The baffle 35 is secured here against falling out by a screw 39 and by the drive unit 36 in the manner of a rear engagement. Alternatively, the baffle can also be guided by way of guide rollers.

The baffle 35 has a number of control openings 40 juxtaposed in the longitudinal direction X. The control openings 40 are designed as elongated holes. Each control opening 40 corresponds here to a pair of inlet openings 33a and 33b such that in an open position, illustrated in FIGS. 4 and 5, of the baffle 35 one pair each of inlet openings 33a and 33b are completely released by the corresponding control opening 40. It is possible by activating the drive unit 36 for the baffle 35 to be adjusted from the open position into a closed position (not illustrated in more detail) in which the inlet openings 33a, 33b and the control openings 40 lie next to one another in a fashion displaced in a longitudinal direction X and free from overlap such that one pair each of inlet openings 33a and 33b are covered by a web 41, respectively formed between two neighboring control openings 40, of the baffle 35. By driving the drive unit 36, the baffle 35 can be adjusted reversibly and continuously between the open position and closed position such that the airflow L in the interior 23 of the detector unit 4 can likewise be regulated continuously.

A detector unit 4 of a computer tomograph 1 is specified by way of summary that is simple with regard to implementation, effective and, in particular, rotationally stable. The detector unit includes a base surface 20 that faces a support ring 7 of a gantry 2 of the computer tomograph 1 in a mounting position, and a detector surface 9 that is angled away from the base surface 20 in an approximately perpendicular fashion, faces an isocentric axis (5) of the gantry 2 in the mounting position, and along which there are fitted a number of detector elements 25 for detecting x-radiation R. The base surface 20 has in this case an air inlet 21 that is fitted in such a way that a cooling airflow L applied from outside to the base surface 20 is guided onto the inner side 24 of the detector surface 9. In the mounting position, the air inlet 21 corresponds with an air channel 13 guided in the support ring 7 or between the rotary carriage 6 and the support ring 7.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector unit for a computer tomograph, comprising:
   a base surface facing a support ring of a gantry in a mounting position; and
   a detector surface angled away from the base surface in an approximately perpendicular fashion, facing an isocentric axis of the gantry in the mounting position, and along which there are fitted a number of detector elements for detecting x-radiation; wherein
   the base surface includes an air inlet fitted in such a way that a cooling airflow applied from outside to the base surface is guided onto an inner side of the detector surface, and
   the base surface is a mounting surface for mounting the detector unit directly to a rear wall of a rotary carriage of the gantry.

2. The detector unit as claimed in claim 1, wherein the air inlet is guided at a small spacing from an edge delimiting the base surface from the detector surface.

3. The detector unit as claimed in claim 2, wherein the air inlet includes an arcuate contour adapted to a curvature of the detector surface.

4. The detector unit as claimed in claim 2, wherein the air inlet is formed by a number of juxtaposed inlet openings.

5. The detector unit as claimed in claim 2, further comprising:
   a control device for controlling the airflow and for at least one of reversibly sealing and releasing the air inlet.

6. A computer tomograph comprising:
   a gantry including a rotary carriage, rotatable about an isocentric axis, and a support ring supporting the rotary carnage; and
   a detector unit as claimed in claim 2, held in the rotary carriage in such a way that the base surface of the detector unit bears against a rear wall of the rotary carriage neighboring on the support ring, wherein the air inlet, provided in the base surface of the detector unit, through a passage opening in the rear wall corresponds with an air charmel guided at least one of inside the support ring and between the support ring and the rotary carriage.

7. The detector unit as claimed in claim 1, wherein the air inlet includes an arcuate contour adapted to a curvature of the detector surface.

8. The detector unit as claimed in claim 1, wherein the air inlet is formed by a number of juxtaposed inlet openings.

9. The detector unit as claimed in claim 1, further comprising:
   a control device for controlling the airflow and for at least one of reversibly sealing and releasing the air inlet.

10. The detector unit as claimed in claim 1, further comprising:
    an air outlet arranged on an outer surface situated opposite the detector surface.

11. A detector unit for a computer tomograph, comprising:
    a base surface facing a support ring of a gantry in a mounting position; and
    a detector surface angled away from the base surface in an approximately perpendicular fashion, facing an isocentric axis of the gantry in the mounting position, and along which there are fitted a number of detector elements for detecting x-radiation; wherein the base surface includes an air inlet fitted in such a way that a cooling airflow applied from outside to the base surface is guided onto an inner side of the detector surface; and a control device for controlling the airflow and for at least one of reversibly sealing and releasing the air inlet; wherein the control device includes a baffle that is arranged in a fashion capable of displacement parallel to the base surface and by which the air inlet is at least one of released and at least partially covered depending on the baffle position.

12. The detector unit as claimed in claim 11, wherein the air inlet includes a number of inlet openings, and wherein the baffle is provided with a number of control openings, each inlet opening corresponding with a control opening in an open position of the baffle, and the inlet openings and the control openings being arranged at least substantially in a fashion free from overlap in a closed position of the baffle.

13. The detector unit as claimed in claim 12, wherein the baffle is displaceable in the longitudinal direction of the air inlet.

14. The detector unit as claimed in claim 13, further comprising a motorized drive unit for adjusting the baffle.

15. The detector unit as claimed in claim 12, further comprising a motorized drive unit for adjusting the baffle.

16. The detector unit as claimed in claim 11, further comprising a motorized drive unit for adjusting the baffle.

17. A computer tomograph comprising:

a gantry including a rotary carriage, rotatable about an isocentric axis, and a support ring supporting the rotary carnage; and a detector unit including, a base surface facing a support ring of a gantry in a mounting position, and a detector surface angled away from the base surface in an approximately perpendicular fashion, facing an isocentric axis of the gantry in the mounting position, and along which there are fitted a number of detector elements for detecting x-radiation, wherein the base surface includes an air inlet fitted in such a way that a cooling airflow applied from outside to the base surface is guided onto an inner side of the detector surface, the detector unit being held in the rotary carnage in such a way that the base surface of the detector unit bears against a rear wall of the rotary carriage neighboring on the support ring, wherein the air inlet, provided in the base surface of the detector unit, through a passage opening in the rear wall corresponds with an air channel guided at least one of inside the support ring and between the support ring and the rotary carriage.

18. The computer tomograph as claimed in claim 17, characterized by a fan arranged in the support ring and corresponding with the air channel.

19. A detector unit for a computer tomograph, comprising:

a base surface facing a support ring of a gantry in a mounting position; and a detector surface angled away from the base surface in an approximately perpendicular fashion, facing an isocentric axis of the gantry in the mounting position, and along which there are fitted a number of detector elements for detecting x-radiation; wherein the base surface includes an air inlet fitted in such a way that a cooling airflow applied from outside to the base surface is guided onto an inner side of the detector surface; and a control device for controlling the airflow and for at least one of reversibly sealing and releasing the air inlet; wherein the air inlet is guided at a small spacing from an edge delimiting the base surface from the detector surface, and the control device includes a baffle that is arranged in a fashion capable of displacement parallel to the base surface and by which the air inlet is at least one of released and at least partially covered depending on the baffle position.

20. The detector unit as claimed in claim 19, wherein the air inlet includes a number of inlet openings, and wherein the baffle is provided with a number of control openings, each inlet opening corresponding with a control opening in an open position of the baffle, and the inlet openings and the control openings being arranged at least substantially in a fashion free from overlap in a closed position of the baffle.

21. The detector unit as claimed in claim 20, wherein the baffle is displaceable in the longitudinal direction of the air inlet.

* * * * *